Patented June 10, 1941

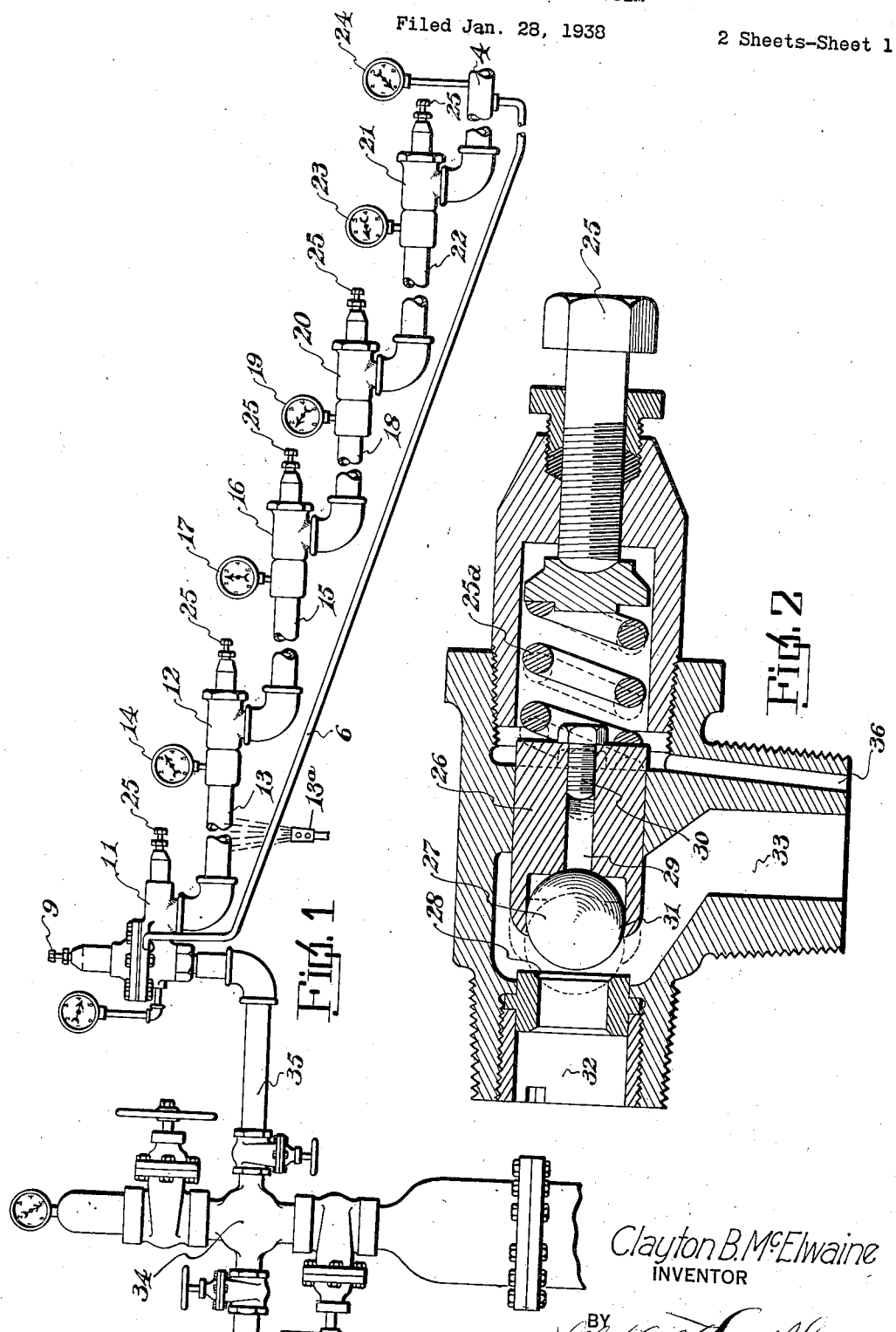

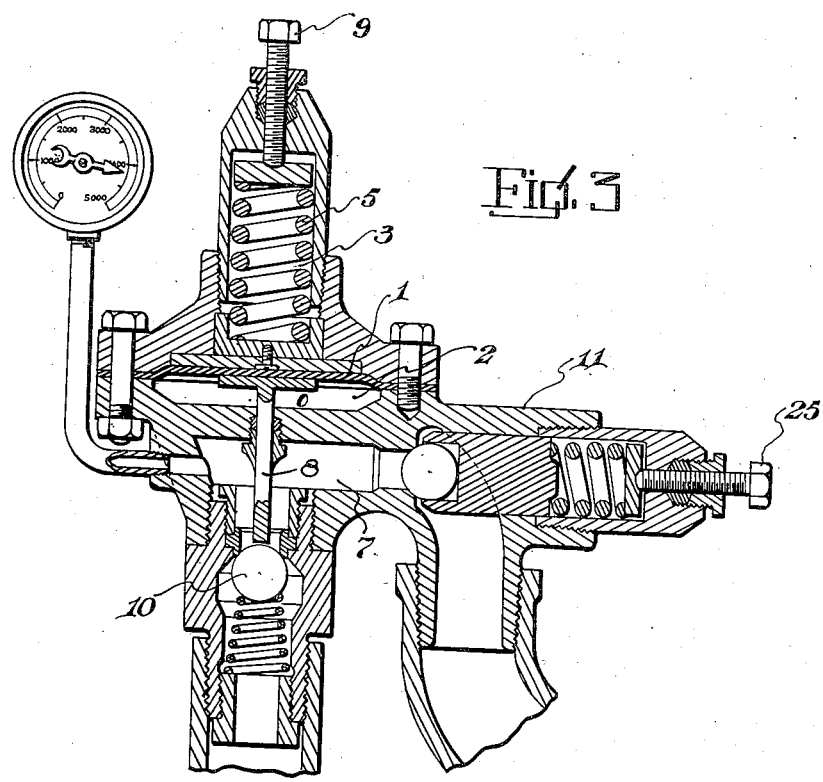

2,245,210

UNITED STATES PATENT OFFICE 2,245,210

BACK PRESSURE VALVE SYSTEM

Clayton B. McElwaine, Tulsa, Okla., assignor of fifty-one per cent to Henry N. Greis, Tulsa, Okla.

Application January 28, 1938, Serial No. 187,525

1 Claim. (Cl. 48—191)

The invention relates to back pressure valve systems, and has for its object to provide, in connection with a regulator valve, for instance of the type shown in my application for Patent, Serial No. 148,805, a back-pressure valve system wherein a gradual pressure decline is accomplished for distributing the heat loss from high to low pressure over a considerable distance, not allowing the low temperature, caused by rapid expansion of gas, to centralize on moving parts of the regulator, which would cause "ice bind" and throw the system out of balance.

A further object is to provide a step down system for the gas pressure in gradual steps for holding down the velocity of the gas incident to rapid expansion, and reducing the flow minimum to a point where it has lost its power for wire cutting of parts which destroy valves and valve seats.

A further object is to provide a gas pressure step down system in connection with a diaphragm regulator which may be applied directly to the "Christmas tree" of a gas well, thereby eliminating expansive piping and regulator systems as at present used.

A further object is to provide a plurality of spring actuated and adjusted back pressure valves in connection with a diaphragm controlled gas presure regulator valve, by means of which any number of degrees of resistance can be set up to vary the pressure drop at any stage and obviating the galloping and irregular operation resulting from passing the gas through a plurality of diaphragm controlled regulator valves.

A further object is to provide a gas pressure reducing system whereby the pressure is stepped down gradually from the regulator to the demand pipe line in decentralized relation so that it can be handled by raising the gas temperature by heating at certain stages of reduction, and at the same time reduce the gas velocity and its cutting action as it passes through the system to the demand pipe line, the predetermined pressure of which controls the regulator.

A further object is to provide a tandem hookup of back pressure valves in connection with the diaphragm controlled regulator, whereby should one of the valves freeze or cut out, any one of the others would hold the high pressures back and not permit said pressure to enter the low pressure zone or demand pipe and create a dangerous condition therein, incident to high pressure.

A further object is to provide a means whereby the spring actuated back pressure valves are balanced from the high and low pressure sides thereof. The low pressure side is balanced in connection with the spring through ports on the low pressure sides.

A further object is to reduce the number of necessary heating zones to a minimum by adjusting the operating pressures by the various back pressure valves through their spring means and low pressure from the low pressure sides thereof.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:

Figure 1 is a view in elevation of the regulator system showing the same applied to one side of a conventional form of "Christmas tree."

Figure 2 is a vertical longitudinal sectional view through one of the back pressure valves.

Figure 3 is a vertical longitudinal sectional view through a diaphragm controlled regulator valve.

Figure 3 shows a diaphragm controlled regulator valve, as shown in the application above identified, however it is to be understood applicant does not limit himself to any particular form of regulator valve to be used in the system, and this one shown for illustrative purposes only. Briefly, the operation of the regulator valve and its construction is as follows. A cup shaped flexible diaphragm 1 is held within the casing sections and divides the casing chamber into compartments 2 and 3. For an example the diaphragm active area is twenty square inches. The compartment 2, under the diaphragm, holds the same pressure that exists in the down stream line on the demand side of the system of eight pounds, said demand line being designated by the numeral 4. This pressure is the motive force governing the automatic operation of the regulating unit.

The compartment 3, above the diaphragm, houses the counteracting spring 5. The principle of operation is balance. It is evident if pressure is applied in the lower chamber 2 it will push the diaphragm upwardly against the action of the spring 5. A mechanical movement has taken place and pressure has been converted into power, whose force or energy is in direct proportion to the gauge pounds per square inch exerted, multiplied by the twenty square inches of active area of the diaphragm. Assuming that eight pounds per square inch of pressure is to be maintained in the down stream line 4 under control, this pressure is backed up through the static line 6 of the under side of the diaphragm in the chamber 2. This eight pounds of pressure exerted against the diaphragm's twenty square inch area makes a total of 160 pounds upward pressure, and this together with the five thousand pound thrust upwardly, through the stem 8, equals five thousand, one hundred and sixty pounds. The heavy spring 5 above the diaphragm is compressed by the adjusting screw 9 until its expansive energy just equals five thousand one hundred and sixty pounds of downward pressure, therefore both the up and down forces are in perfect balance. If the pressure in the down stream line falls slightly, this drop will be multiplied twenty times under the diaphragm, therefore should the drop be one half a pound in the down stream line, the upward pressure under the diaphragm would be lessened ten pounds. This would throw the unit out of balance in favor of the spring, and in its downward movement, it would unseat the ball valve 10, releasing additional volume from the well into the intermediate chamber 7. When sufficient volume has passed through and along through the back pressure valves hereinafter set forth to build up the pressure in the down stream line, this pressure being passed back to the chamber 2 under the diaphragm it would again cut the flow down.

The diaphragm control regulator is provided with a back pressure valve 11, clearly shown in Figure 3, and the discharge side of this valve is connected to a reduction valve 12 by a pipe connection 13 having a pressure gage 14 in connection therewith. The reduction valve 12 discharges into a pipe connection 15 leading to a reduction valve 16, and is provided with a pressure gage 17. All of the gages allow the pressure in the particular zones to be easily ascertained. Connected to the discharge side of the reduction valve 16 is a pipe connection 18 having a pressure gage 19. Pipe 18 is connected to the reduction valve 20, which is in turn connected to the reduction valve 21 by a pipe 22 having a pressure gage 23. The service of down stream pipe 4 is connected to the reduction valve 21 and the pipe 4 is provided with a pressure gage 24 whereby the pressure therein can be easily ascertained, and the adjusting screws 25 of the various reduction valves adjusted against the expansive action of the springs 25a for forcing the valve plungers 26 with their ball valves 27 to various pressure seating engagement with the valve seats 28 for opening at various pressures, hence the steps of reduction can be easily and quickly regulated. The plungers 26 of each reduction valve are preferably provided with apertures 29, through which an instrument may be placed when the closure screws 30 are removed therefrom for forcing the spherical valves 27 from their seats 31, in which they rotate for changing their seating positions. It will be noted the gas, under pressure, enters each reduction valve through its port 32, and discharged from the reduction valve through the connecting pipe through discharge ports 33.

It has been found in actual practice with a regulator of the type as identified in the application above mentioned, which carries a back pressure unit 11 that a high efficiency is obtained and by making separate unit back pressure valves in connection therewith, connecting the regulator valve with the diaphragm controlled valve to the demand line, a device could be hooked up in tandem on the lower pressure side of the regulator and a result accomplished which has never been approached before. The action resulting from this multiple tandem hook up of back pressure valves amounts to a perfectly divided pressure step down from the high pressure of the well to the desired pressure of the demand line. It has also been demonstrated that the desired result can not be obtained by the use of a plurality of diaphragm controlled regulators. It not only involves more expense but less efficiency. In the first place, regulators of this type are balanced by pressure on the diaphragm and are usually sensitive to slight pressure changes. They can not be kept in synchronized cadence with each other and in operation they open and close out of time, causing a ragged differential chart on the recording instrument from which a reading is taken. Besides this, it is obvious a regular, steady flow under these conditions can not be had. The back pressure valves are spring actuated, therefore not as sensitive as the diaphragm operated regulators, therefore make for constant even flow without fluctuation or galloping. Also an even line on the differential flow chart, which allows accurate reading.

There are two important phases which no other arrangement can overcome, outside of the pressure step down, using the back pressure valves in series or tandem. First, the arrangement reduces freezing by expansion to a minimum; second, by gradual step expansion, the velocity of the gases through and over the valve seats are slowed down, thereby reducing cutting or wire drawing to a minimum. These are the two important conditions which must be overcome, in order that perfect function is maintained in handling extremely high pressures and reducing them to a workable state. In other words instead of there being a sudden pressure reduction at one point, there is a small reduction at spaced points through the hook-up and back pressure valve, thereby eliminating a too quick expansion and consequent freezing at these points, and by reducing the velocity of the gas, damage to the valve structures is eliminated, as the expansion is not centralized at any particular point.

The step down regulator system distributes the refrigeration, caused by expansion, not allowing extreme drops of temperature to occur at any one point, and especially at the regulator, thereby avoiding the freeze sticking at this vital working point. Another result obtained is that gas distillate wells will materially increase their fluid yield under these moderate cracking processes of multiple expansion within limited temperature ranges at the points of gas expansion. The gas flow through the back pressure valves is governed entirely by the regulator's automatic control action, which functions by the pressure introduced under the diaphragm from the by-pass line 6, which is in communication with the line 4 on the down stream side of the hook-up a considerable distance from the regulator valve where the turbulence is reduced to a minimum.

The pressure is the governing factor of the regulator operation and this static condition which is by-passed back to the underneath diaphragm area is a true index to the pressure gage desired for down stream pressure delivery, hence the regulator will act more favorably and show a more uniform easily calculated meter chart. The back pressure valves also remove the extreme refrigeration from the regulator and obviates the necessity of a heater on the high side of the regulator towards the well, hence the regulator can be set directly on the "Christmas tree" 34 of the well and preferably on a pipe 35 carried thereby and through which the gas passes to the diaphragm controlled regulator, hence the economy of the system.

Modern drilling methods have made it possible to reach greater depths and have uncovered new gas producing horizons with rock pressures as high as five thousand pounds per square inch. To reduce these pressures within safe line carrier limits is the work a regulator is called upon to perform. In doing this work the unit must resist the two strong forces of opposition, namely; the cutting out of valve parts incident to velocity of the cutting blast of gas and the forming of freezing hydrates which clog the parts and bind the valves and working parts so they can not function. These two foes of high pressure reduction control are difficult to overcome, for if they happen the high pressures enter the forbidden areas of the down stream zone with resultant danger to life and equipment, which equipment is not designed to stand these high pressure, however accidents often occur where just a regulator is used, and the primary reason for the present back pressure valve is to relieve the regulator of this hazard. It is obvious if one back pressure valve will take part of the load, several of them hooked-up in tandem will be a greater help, however it has been found this can not be accomplished with a plurality of diaphragm controlled regulators for the reasons set forth above.

The present tandem hook-up system shown in Figure 1 will reduce freezing to a minimum by decentralizing the condition so pressure and temperature can be handled and removes this hazard from within the diaphragm controlled regulator. It is well known that the average heat loss caused by rapidly expanding gases is one degree per atmosphere (14.7 pounds) or approximately seven degrees per one hundred pound drop. Referring to Figure 1, it will be seen that four regulator valves for back pressure are shown at 12, 16, 20 and 21 hooked up on the down stream side of the diaphragm controlled regulator, which, in itself, has a back pressure regulator 11 built therein, making five. This last mentioned back pressure valve forms the fifth step of reduction, hence the following example would apply.

5,000 pounds well pressure—90° Fhr.
Each pressure drop is 832 lbs—58° drop
Extreme low side pressure 8 lbs.

Should there be a rapid expansion of five thousand pounds of pressure, there would be a heat loss of 350° and starting at 90° above, a temperature of 260° below zero would be reached. There is no heating device which could hope to cope with such a condition centralized in so small a cubic area. By this it will readily be seen that everything would be frozen tightly under such a low temperature.

Referring to the above conditions of temperature in relation to the step down method, the advantages of the step down method will be readily seen. In the present device the well pressure is five thousand pounds per square inch, and the first reduction is past the diaphragm actuated valve 10 in the regulator, and it drops to 4,168 pounds in the intermediate chamber 7. It will be noted that the temperature starts with 90° and the first step reduced the pressure 832 pounds, therefore there was a heat loss of 58° bringing the temperature to 32° above zero. This step was a critical one because the gas has passed the diaphragm actuated valve which is the controlling factor in the whole system. The next step brings a pressure reduction of 832 pounds past the back pressure valve 11 that is built into the regulator with a temperature loss of 58° which brings the temperature of the gas to 26° below zero. At this stage in the pipe 13 the gas is heated, for instance by a conventional type of torch 13a, however any kind of heating device may be used. The temperature in this pressure area can be brought up to 150° before the gas enters back pressure valve 12 where a further pressure drop of another 832 pounds is accomplished with a further temperature drop of 58°. As the gases enter back pressure valve 16 their temperatures will be 92° and as they leave valve 16 to enter valve 20 they will have a temperature of 34°. After the gas leaves back pressure valve 20 the heat loss will bring it down to 24° below zero and the pressure will be reduced 832 pounds. The zone between valves 20 and 21 will need an application of heat in order to again bring the temperature to a higher point as was the case in the second step of reduction at 13. In this final heating point it is not necessary to obtain a high point of temperature, for there is only one more reduction step, so if it is only brought back to its original temperature of 90°, the next step will bring it down to 32° where it enters the demand zone of eight pounds. From the above it will be seen that the well pressure has been reduced from five thousand pounds to eight pounds demand and instead of the 260° below zero in one step, the temperature has never been taken below 26° below zero.

Referring to the back pressure valve shown in Figure 2, as an illustration of the operation of each back pressure valve, it will be seen that the pressures of operation of the valve may be easily adjusted by the adjusting screw 25, which co-operates with the expansion spring 25a, which engages the plunger 26 and forces the same towards the valve seat, so various degrees of back pressure may be held on the high pressure side thereof. There is a pressure of 3,336 pounds on one side of the valve assuming an exposed area of one square inch, and this is counteracted or offset by 2,504 pounds on one square inch on the rear side of the plunger 26 through the low pressure side port 36 together with a spring tension of 832 pounds making a total of 3,336 pounds, thus balancing the two opposing forces, hence it will be seen the pressure reductions will take place at each step from the diaphragm controlled regulator to the demand pipe. It will be noted that the port 36 communicates with the spring chamber to the rear of the plunger 26 to help the spring close the valve, and from the down stream side of the valve.

The back pressure valve, without the regulator, will hold back, not allowing extreme pressures to enter a pipe area. If in such a use, the pressures do built up, the built up excess pressures supplement the spring and the tendency of the back pressure valve is a spring and pressure over-balance to close.

Sometimes it is desired to have two separate and distinct delivery lines of different pressures off the same well, for instance 700 pounds for pressure lift purposes, and a down stream low of 200 pounds for boiler fuel delivery. This result may be obtained through the reduction system by connecting the pressure lift pipe line on the upstream side of final back pressure valve and adjusting this valve to hold back the desired 700 pound pressure for this high pressure line; this does not disturb the regulator set for the 200 pound down stream line. Both of these pressures are under accurate control of the same regulating unit.

The invention having been set forth what is claimed as new and useful is:

A gas pressure reducing device comprising a diaphragm controlled regulator valve carried by a Christmas tree mounted on a well casing and through which gas under pressure passes directly to a demand main line, a by-pass pipe forming a direct connection between the demand main line and the regulator valve, of a plurality of spaced pressure reduction valves carried by the main line and forming a direct connection between the demand line and regulator, said reduction valves having pipe connections with each other and with the demand pipe line on the down stream side thereof and through which the gas from the regulator passes and forming means, whereby a step by step reduction of pressure and temperature of gas is obtained in its passage to the main demand line, said pressure reduction valves comprising casings, plungers slidably mounted within said casings, and controlling the flow of gas from the high to the low pressure sides thereof, expansion springs for normally seating the valves in the direct connection, means for varying the tension of the expansion springs, whereby the regulator valves will close at predetermined pressures and means for admitting pressure from the down stream side of each of the valves to supplement the spring action on the plungers.

CLAYTON B. McELWAINE.